(12) United States Patent
Kuraki et al.

(10) Patent No.: US 10,651,935 B2
(45) Date of Patent: May 12, 2020

(54) SIGNAL ADJUSTMENT APPARATUS AND SIGNAL ADJUSTMENT METHOD

(71) Applicant: FUJITSU LIMITED, Kawasaki-shi, Kanagawa (JP)

(72) Inventors: Kensuke Kuraki, Ichikawa (JP); Ryuta Tanaka, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/373,579

(22) Filed: Apr. 2, 2019

(65) Prior Publication Data

US 2019/0229804 A1 Jul. 25, 2019

Related U.S. Application Data

(63) Continuation of application No. PCT/JP2016/080287, filed on Oct. 12, 2016.

(51) Int. Cl.
*H04B 10/116* (2013.01)
*H04N 19/467* (2014.01)
*H04N 21/8358* (2011.01)
*H04N 21/234* (2011.01)
*H04N 1/387* (2006.01)
*H04N 5/77* (2006.01)

(52) U.S. Cl.
CPC .......... *H04B 10/116* (2013.01); *H04N 1/387* (2013.01); *H04N 5/772* (2013.01); *H04N 19/467* (2014.11); *H04N 21/234* (2013.01); *H04N 21/8358* (2013.01)

(58) Field of Classification Search
CPC .... H04B 10/116; H04N 5/772; H04N 19/467; H04N 21/234; H04N 21/8358; H04N 1/387
USPC ........................................................ 398/172
See application file for complete search history.

(56) References Cited

U.S. PATENT DOCUMENTS

| | | | |
|---|---|---|---|
| 2001/0044899 A1 | 11/2001 | Levy | |
| 2004/0126097 A1 | 7/2004 | Aridome | |
| 2006/0045308 A1* | 3/2006 | Abrams | G11B 20/00086 |
| | | | 382/100 |

(Continued)

FOREIGN PATENT DOCUMENTS

| CN | 105429701 | 3/2016 |
|---|---|---|
| EP | 2999145 A1 | 3/2016 |

(Continued)

OTHER PUBLICATIONS

International Search Report, mailed in connection with PCT/JP2016/080287 and dated Dec. 20, 2016, with English translation (1 page).

(Continued)

*Primary Examiner* — Dalzid E Singh
(74) *Attorney, Agent, or Firm* — Fujitsu Patent Center

(57) ABSTRACT

A signal adjustment apparatus includes a memory configured to store a first video obtained by imaging an object reflecting light that changes in time series in accordance with information embedded in the light, a processor coupled to the memory and configured to analyze the first video to specify an area in which the information is embedded in an image included in the first video, adjust a signal in the area, and output a second video including the adjusted signal.

17 Claims, 14 Drawing Sheets

(56) References Cited

U.S. PATENT DOCUMENTS

| | | | |
|---|---|---|---|
| 2007/0086669 A1* | 4/2007 | Berger | G06K 9/2081 |
| | | | 382/243 |
| 2012/0133815 A1* | 5/2012 | Nakanishi | H04B 10/1141 |
| | | | 348/333.02 |
| 2014/0016817 A1* | 1/2014 | Nakagata | H04N 19/467 |
| | | | 382/100 |
| 2015/0188632 A1* | 7/2015 | Aoyama | H04B 10/116 |
| | | | 398/118 |
| 2016/0080079 A1 | 3/2016 | Kuraki et al. | |
| 2016/0112125 A1* | 4/2016 | Yokoi | H04B 10/116 |
| | | | 398/118 |
| 2017/0099104 A1 | 4/2017 | Kuraki et al. | |
| 2018/0191437 A1* | 7/2018 | Cha | G06K 9/20 |
| 2018/0248621 A1* | 8/2018 | Lenssen | H04B 10/5563 |

FOREIGN PATENT DOCUMENTS

| | | |
|---|---|---|
| JP | 2002-344720 | 11/2002 |
| JP | 2004-312663 | 11/2004 |
| JP | 2005-39603 | 2/2005 |
| JP | 2008-28563 | 2/2008 |
| JP | 2016-63347 | 4/2016 |
| WO | 2016/001972 | 1/2016 |

OTHER PUBLICATIONS

Written Opinion of the International Searching Authority, mailed in connection with PCT/JP2016/080287 and dated Dec. 20, 2016, with partial English translation (16 pages).

EESR—The Extended European Search Report of European Patent Application No. 16918783.8 dated Sep. 11, 2019.

CNOA—Combined Office Action and Search Report of Chinese Patent Application No. 201680089949.0 dated Nov. 26, 2019 with full English translation.

JPOA—Office Action of Japanese Patent Application No. 2018-544628 dated Feb. 12, 2020 with Full Machine translation.

\* cited by examiner

FIG. 10

| COMPRESSION SCHEME | RESOLUTION | BIT RATE | RECIPROCAL OF ATTENUATION FACTOR |
|---|---|---|---|
| MPEG-2 | 1440x1080 | 10Mbps | Q1 |
| H.264/AVC | 1920x1080 | 10Mbps | Q2 |
| H.265/HEVC | 3840x2160 | 1Mbps | Q3 |

SIGNAL ADJUSTMENT APPARATUS AND SIGNAL ADJUSTMENT METHOD

CROSS-REFERENCE TO RELATED APPLICATION

This application is a continuation application of International Application PCT/JP2016/080287 filed on Oct. 12, 2016 and designated the U.S., the entire contents of which are incorporated herein by reference.

FIELD

The embodiments discussed herein are related to a signal adjustment apparatus and a signal adjustment method.

BACKGROUND

As one of visible light communication techniques for transmitting information by using visible light, there is known a communication system in which a transmitting apparatus irradiates an object with light on which information is superimposed and a reception apparatus images the object to detect the superimposed information. According to this communication system, it is possible to distribute information related to an object irradiated with light to a smart device or the like equipped with a camera.

A digital watermark technique for embedding additional information in an image, a technique for multiplexing additional information in compressed image data, and the like are also known.

In the case of embedding information in illumination light to irradiate an object and providing a video obtained by imaging a scene including the object to a user, the signal representing the information embedded in the video becomes weak and it may be difficult to detect the information from the video.

The followings are reference documents.
[Document 1] International Publication Pamphlet No. WO 2016/001972,
[Document 2] Japanese Laid-open Patent Publication No. 2002-344720,
[Document 3] Japanese Laid-open Patent Publication No. 2005-39603, and
[Document 4] Japanese Laid-open Patent Publication No. 2004-312663.

SUMMARY

According to an aspect of the invention, a signal adjustment apparatus includes a memory configured to store a first video obtained by imaging an object reflecting light that changes in time series in accordance with information embedded in the light, a processor coupled to the memory and configured to analyze the first video to specify an area in which the information is embedded in an image included in the first video, adjust a signal in the area, and output a second video including the adjusted signal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is a diagram illustrating attenuation factor information;

DESCRIPTION OF EMBODIMENTS

Hereinafter, an embodiment will be described in detail with reference to drawings. As an application example of a visible light communication technique, it is assumed that information is embedded in the illumination light of an imaging location such as an event venue or an imaging studio, an object is irradiated with the illumination light, and a video of an imaged scene including the object is provided to a user through television (TV) broadcasting, Internet distribution, or the like. It is possible for the user to acquire additional information related to the object at the imaging location, the broadcast program, and the like based on the information embedded in the video by imaging the screen of a TV receiver or personal computer (PC) displaying the provided video with a camera.

However, when the reflectance of the object surface is less than a predetermined value, the signal representing the embedded information may be weakened. Furthermore, compression processing may be applied to the imaged video for TV broadcasting or Internet distribution. In this case, the weak signal embedded in the video becomes weaker or disappears, and therefore it is difficult to detect the information from the video imaged on the screen.

The digital watermark embedding processing apparatus disclosed in PTL 2 detects a digital watermark corresponding to each bit from an image in which a digital watermark is embedded to set the strength of the digital watermark pattern and executes re-embedding or additional embedding based on the excess or deficiency of the detected strength of the digital watermark.

However, in this method, since the detected strength is measured while referring to the digital watermark pattern to be embedded in the image, it is difficult to apply the method in the case of not knowing the information embedded in the illumination light. Furthermore, since the area in which information is embedded changes in each frame of the video depending on the positional relationship between the object irradiated with the illumination light and the camera used for imaging, it is difficult to calculate the correlation between the image of each frame and the embedded information, and it is difficult to measure the detected strength.

Not only in the case of compressing a video for TV broadcasting or Internet distribution, but also such a problem arises even in a case where the video obtained by imaging the object reflecting the light in which the signal is embedded is provided to the user in another form.

Figure 1:
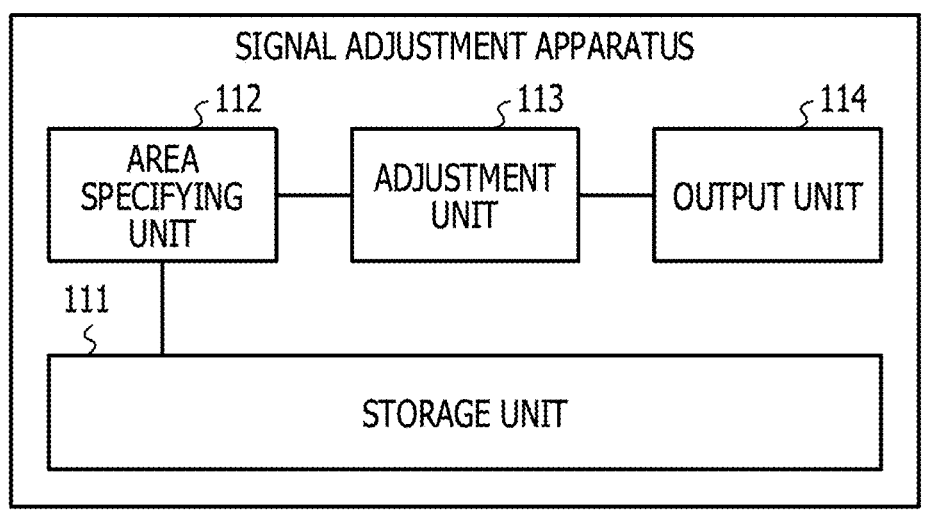
FIG. 1 is a functional configuration diagram of a signal adjustment apparatus.

FIG. 1 illustrates a functional configuration example of a signal adjustment apparatus according to an embodiment. A signal adjustment apparatus 101 of FIG. 1 includes a storage unit 111, an area specifying unit 112, an adjustment unit 113, and an output unit 114. The storage unit 111 stores a first video obtained by imaging an object reflecting light in which a signal changing in time series is embedded. The area specifying unit 112 and the adjustment unit 113 perform signal adjustment processing on the first video stored in the storage unit 111.

Figure 2:
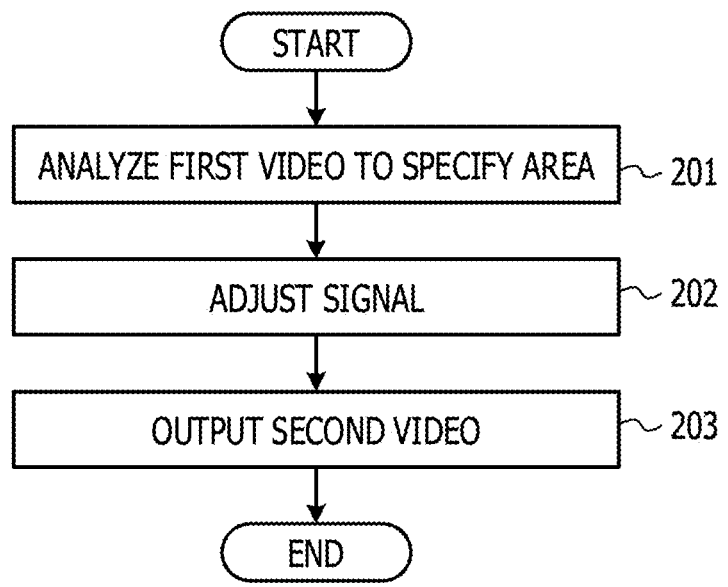
FIG. 2 is a flowchart of signal adjustment processing.

FIG. 2 is a flowchart illustrating an example of signal adjustment processing. First, the area specifying unit 112 analyzes the first video to specify an area in which the signal is embedded in the image included in the first video (step 201). Next, the adjustment unit 113 adjusts the signal embedded in the area specified by the area specifying unit 112 (step 202). Then, the output unit 114 outputs a second video including the signal adjusted by the adjustment unit 113 (step 203).

According to such a signal adjustment apparatus, it is possible to provide a video obtained by imaging an object reflecting light in which a signal is embedded, in a form that may be detected even if the signal is attenuated.

Figure 3:
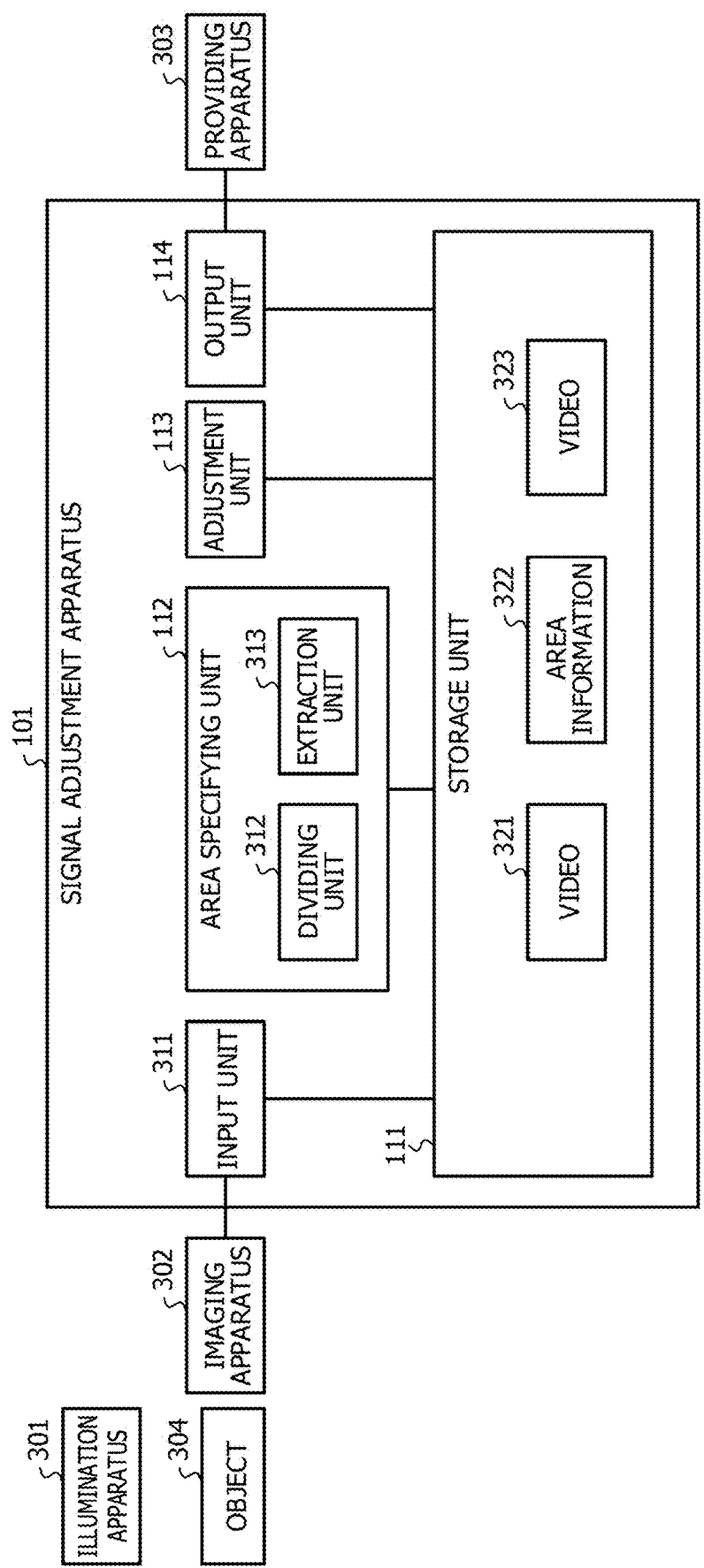
FIG. 3 is a functional configuration diagram illustrating a specific example of the signal adjustment apparatus.

FIG. 3 illustrates a specific example of the signal adjustment apparatus 101 of FIG. 1. The signal adjustment apparatus 101 of FIG. 3 includes the storage unit 111, the area specifying unit 112, the adjustment unit 113, the output unit 114, and an input unit 311. The area specifying unit 112 includes a dividing unit 312 and an extraction unit 313.

For example, an illumination apparatus 301 is disposed at an imaging location such as an event venue or an imaging studio and irradiates an object 304 with illumination light in which a signal changing in time series is embedded. For example, a signal may be embedded in the illumination light by using the technique disclosed in PTL 1. The object 304 may be a performer acting on an event or on a TV program or may be a structure installed at an imaging location. The illumination light in which a signal is embedded may be light accompanied by a minute color change to the extent that the performer does not notice.

An imaging apparatus 302 is, for example, a camera disposed at an imaging location and images the object 304 reflecting the illumination light to output a video including a plurality of images at each of a plurality of times. The image at each time may be called a frame.

The input unit 311 receives the video output from the imaging apparatus 302 and stores the received video as a video 321 in the storage unit 111. The dividing unit 312 of the area specifying unit 112 divides each frame of the video 321 into a plurality of areas. The size of each area is one or more pixels and is equal to or smaller than the total number of pixels of one frame. The extraction unit 313 analyzes the frequency characteristic in the time direction for each area and extracts an area in which a signal is embedded based on the magnitude of the amplitude of the signal having a specific frequency. Then, the extraction unit 313 stores area information 322 indicating the extracted area in the storage unit 111.

The adjustment unit 113 adjusts the signal embedded in each area indicated by the area information 322, generates a video 323 including the adjusted signal, and stores the video 323 in the storage unit 111. The magnitude of the amplitude of the embedded signal may vary from area to area due to the influence of reflectance or the like on the surface of the object 304. Therefore, the adjustment unit 113 performs adjustment processing according to each area.

The output unit 114 outputs the video 323 to a providing apparatus 303. The providing apparatus 303 is, for example, a broadcast apparatus that performs TV broadcasting, a distribution apparatus that performs Internet distribution, or the like. The providing apparatus 303 compresses the video 323 output from the signal adjustment apparatus 101 and broadcasts or distributes the compressed video 323. The user acquires additional information related to the object 304, the broadcast program, and the like from the information embedded in the video 323 by imaging the video 323 provided by the providing apparatus 303 with a camera.

Figure 4:
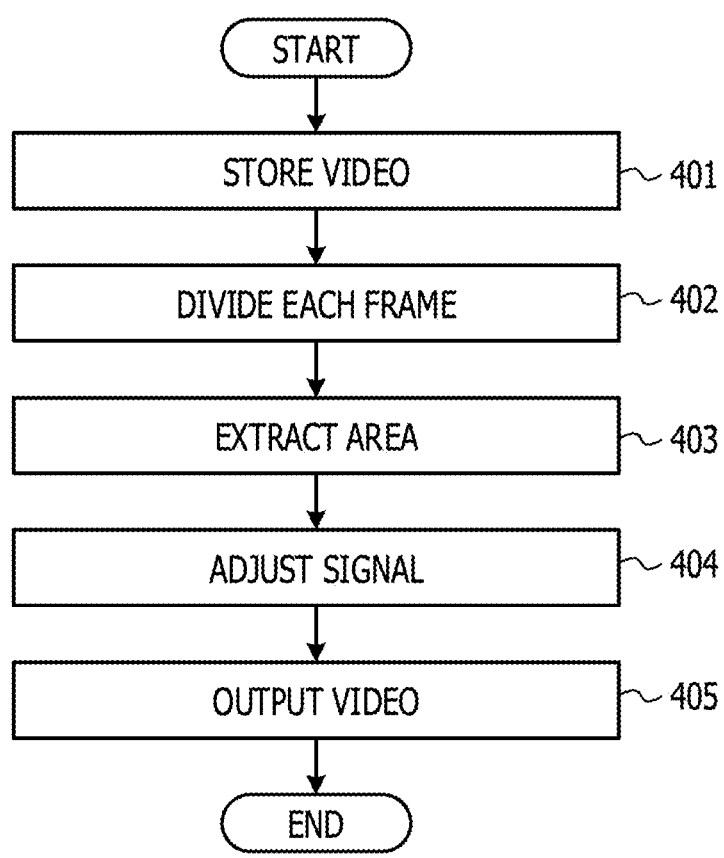
FIG. 4 is a flowchart illustrating a specific example of signal adjustment processing.

FIG. 4 is a flowchart illustrating a specific example of signal adjustment processing performed by the signal adjustment apparatus 101 in FIG. 3. First, the input unit 311 stores the video received from the imaging apparatus 302 as the video 321 in the storage unit 111 (step 401).

Next, the dividing unit 312 divides each frame of the video 321 into a plurality of areas (step 402), and the extraction unit 313 analyzes the frequency characteristic in the time direction for each area, extracts an area in which the signal is embedded, and generates the area information 322 (step 403).

Next, the adjustment unit 113 adjusts the signal embedded in each area indicated by the area information 322 to generate the video 323 (step 404), and the output unit 114 outputs the video 323 to the providing apparatus 303 (step 405).

According to such signal adjustment processing, in the case of planning a project of visible light communication by illumination light at an event venue or an imaging studio, and the like, at the same time as providing information to visitors, information may be provided to viewers who are at a remote place via TV broadcast or Internet distribution or the like. Accordingly, viewers of TV broadcasting or Internet distribution may also participate in the project using information provided via the video.

Figure 5:
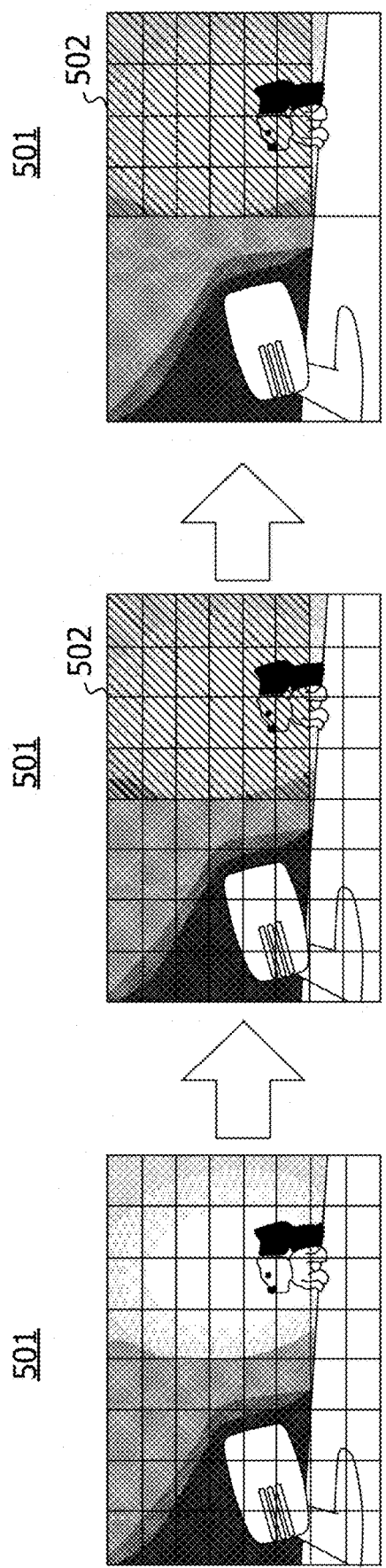
FIG. 5 is a diagram illustrating area segmentation processing and area extraction processing.

FIG. 5 illustrates an example of area division processing in step 402 of FIG. 4 and area extraction processing in step 403. The dividing unit 312 divides an image 501 corresponding to one frame included in the video 321 into a plurality of rectangular areas. Then, the extraction unit 313 extracts each rectangular area included in the area 502 corresponding to the irradiation range of the illumination light as an area in which the signal is embedded.

Figure 6:
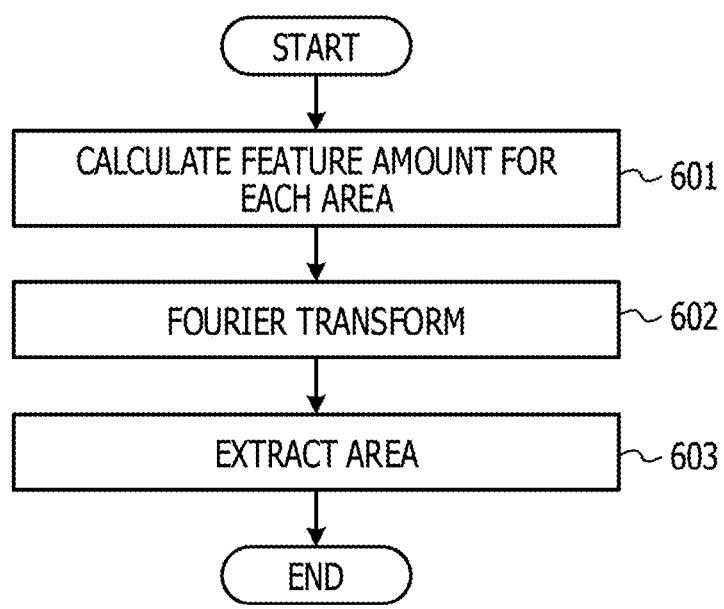
FIG. 6 is a flowchart of area extraction processing.

FIG. 6 is a flowchart illustrating an example of area extraction processing in step 403 of FIG. 4. First, the extraction unit 313 calculates a feature amount representing the signal embedded in the illumination light for each area in each frame at each time and stores the feature amount in the storage unit 111 (step 601). For example, statistical values such as an average value, a sum total, a maximum value, a minimum value, a mode value, a median value, and the like of pixel values corresponding to each color component in the RGB color space may be used as a feature amount of each area.

Next, the extraction unit 313 performs Fourier transformation using the feature amount of each area in a plurality of frames within a predetermined period and converts the temporal change of the feature amount for each area into a frequency domain expression (step 602).

Then, the extraction unit 313 calculates the intensity of the signal having the same frequency as the signal embedded in the illumination light from the converted frequency domain expression to extract an area in which the calculated intensity is within a predetermined range as an area in which the signal is embedded (step 603). As the intensity of the signal, for example, the amplitude of the signal, the square of the amplitude, or the like may be used.

Figure 7A:
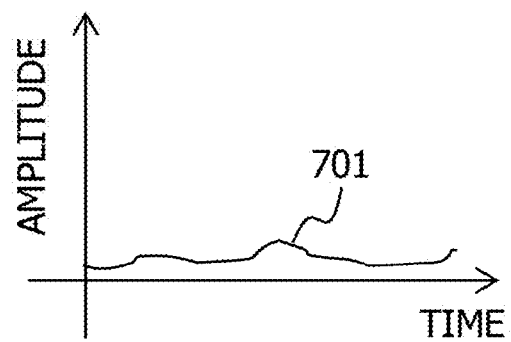
FIGS. 7A to 7C are diagrams illustrating a temporal change in amplitude of a signal.
Figure 7B:
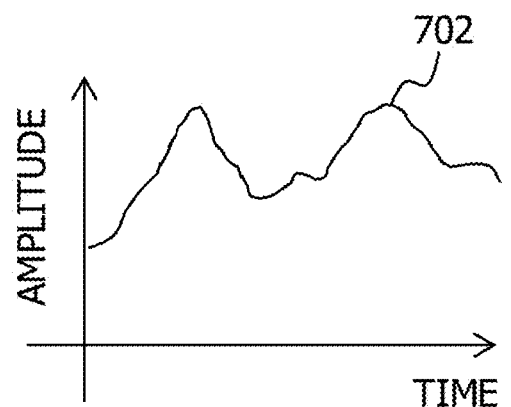
Figure 7C:
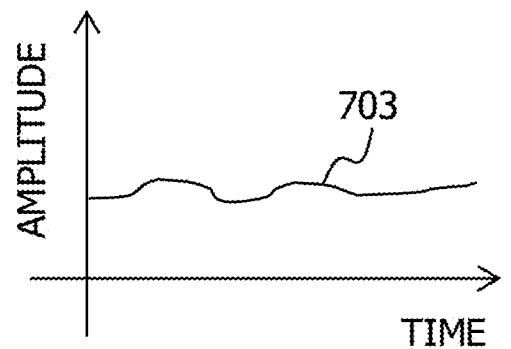

FIGS. 7A to 7C illustrate an example of the temporal change in the amplitude of a signal having the same frequency as the signal embedded in the illumination light. In the case of the temporal change indicated by a waveform 701 in FIG. 7A, since the amplitude of the signal is smaller than a lower limit value of a predetermined range, it is determined that the signal is not embedded in the area in which the waveform 701 is detected.

In the case of the temporal change indicated by a waveform 702 in FIG. 7B, since the amplitude of the signal is larger than an upper limit value of the predetermined range, it is determined that the signal is not embedded in the area in which the waveform 702 is detected. For example, in a case where the illumination light is obstructed by a person or the like moving in an imaging area and a scene change has occurred, there is a possibility that a temporal change like the waveform 702 is detected.

On the other hand, in the case of the temporal change indicated by a waveform 703 in FIG. 7C, since the amplitude of the signal falls within the predetermined range, it is determined that the signal is embedded in the area in which the waveform 703 is detected.

Figure 8:
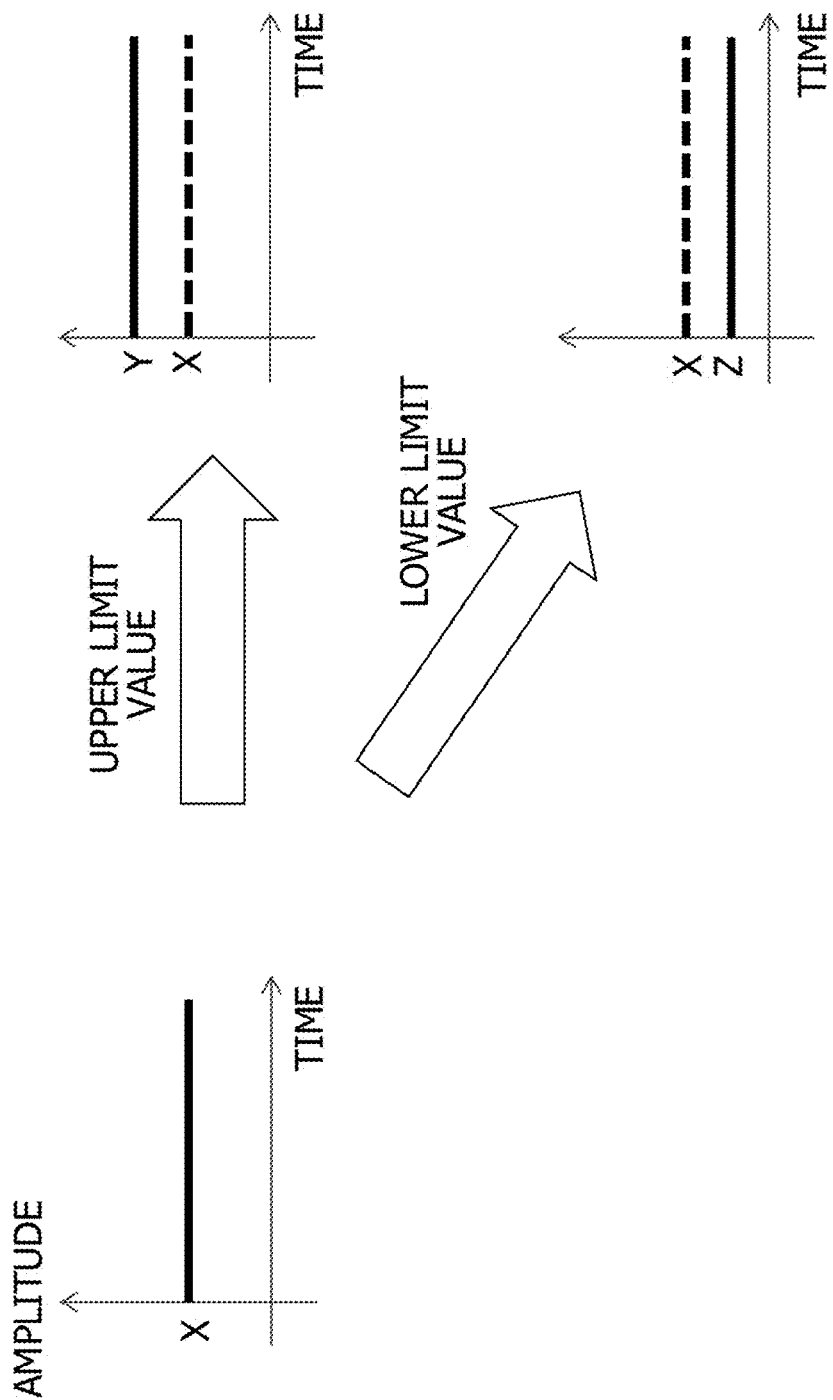
FIG. 8 is a diagram illustrating an upper limit value and a lower limit value of the amplitude of the signal.

FIG. 8 illustrates an example of the upper limit value and the lower limit value of the amplitude of the signal. An upper limit value Y and a lower limit value Z of the predetermined range for determining whether or not a signal is embedded in each area may be determined by the following equation, for example, based on an amplitude X of the signal embedded in the illumination light.

$$Y = X \times M \quad (1)$$

$$Z = X \times N \quad (2)$$

M and N are coefficients determined by prior evaluation experiments or the like, for example, M≥1 and N≥1.

For example, the adjustment unit 113 increases or decreases the intensity of the signal embedded in each area indicated by the area information 322 according to at least one of the compression scheme or the compression rate of the compression processing in which the providing apparatus 303 compresses the video 323. As a result, even in a case where the signal is attenuated by compression processing performed for TV broadcasting or Internet distribution, it is possible to detect the signal from the compressed video.

Figure 9:
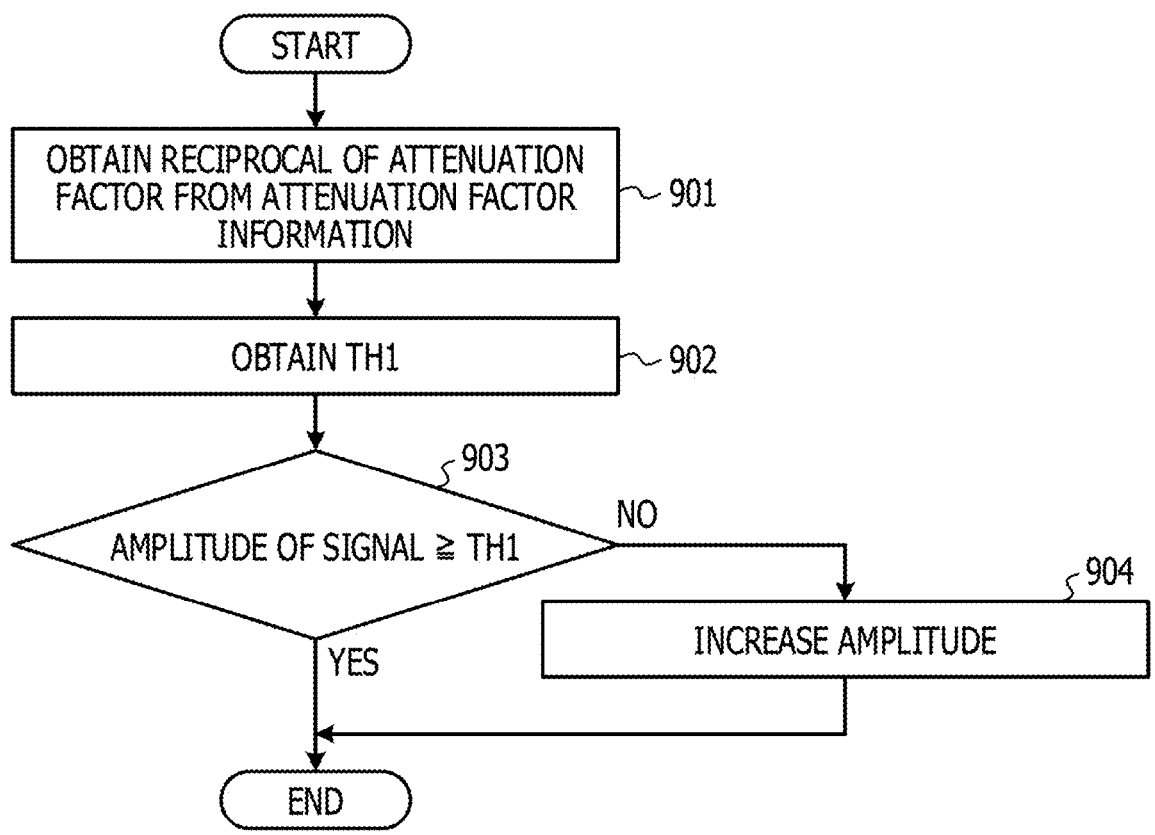
FIG. 9 is a flowchart of first adjustment processing.

FIG. 9 is a flowchart illustrating an example of first adjustment processing in step 404 of FIG. 4. In the first adjustment processing, the storage unit 111 stores attenuation factor information indicating reciprocals of attenuation factors corresponding to a plurality of compression schemes and a plurality of compression rates. A reciprocal Q of the attenuation factor may be calculated by the following equation using, for example, an amplitude A1 of the signal before compression and an amplitude A2 of the signal after compression.

$$Q = A1/A2 \quad (3)$$

The amplitude A1 corresponds to the amplitude of the signal included in the video before compression, and the amplitude A2 corresponds to the amplitude of the signal included in the video restored by the TV receiver or PC receiving the compressed video performing restoration processing.

The reciprocal Q of the attenuation factor calculated by Equation (3) is set as the attenuation factor information by prior evaluation experiments or the like. By storing the attenuation factor information in the storage unit 111 in advance, it is possible to acquire the reciprocal of the attenuation factor immediately in a case where a specific compression scheme and compression rate are given.

The adjustment unit 113 refers to the attenuation factor information to obtain the reciprocal of the attenuation factor corresponding to the compression scheme and the compression rate of the compression processing and obtain a threshold of the amplitude from the reciprocal of the obtained attenuation factor. Then, in a case where the amplitude of the signal embedded in each area indicated by the area information 322 is smaller than the threshold, the adjustment unit 113 increases the amplitude so that the amplitude of the signal is equal to or larger than the threshold.

First, the adjustment unit 113 refers to the attenuation factor information to obtain the reciprocal of the attenuation factor corresponding to the compression scheme and the compression rate of the compression processing (step 901). Then, the adjustment unit 113 multiplies the reciprocal of the obtained attenuation factor by a threshold TH2 for the amplitude A2 of the compressed signal to obtain a threshold TH1 for the amplitude A1 of the signal before compression (step 902). As the threshold TH2, for example, it is possible to use the lower limit value of the amplitude that the signal may detect in the video restored by the TV receiver or PC.

Next, the adjustment unit 113 compares the amplitude of the signal embedded in each area indicated by the area information 322 with TH1 (step 903). In a case where the amplitude of the signal is equal to or larger than TH1, the adjustment unit 113 ends the processing. On the other hand, in a case where the amplitude of the signal is smaller than TH1, the adjustment unit 113 increases the amplitude so that the amplitude of the signal is TH1 or more (step 904). For example, the adjustment unit 113 multiplies the amplitude of the embedded signal by the reciprocal of the attenuation factor to obtain an adjusted amplitude and adjusts the pixel value of each color component in the area so that the amplitude of the signal matches the adjusted amplitude, thereby increasing the amplitude.

It is possible to correct a locally weakened signal due to an optical factor such as a low reflectance of the object surface by adjusting the signal in the area in which the amplitude is smaller than TH1 among the plurality of areas in the frame. At this time, in areas where the signal is weaker, emphasis may be given more strongly by using the reciprocal of the attenuation factor to determine the adjusted amplitude.

FIG. 10 illustrates an example of the attenuation factor information. Each entry of the attenuation factor information of FIG. 10 includes a compression scheme, a resolution, a bit rate, and a reciprocal of the attenuation factor. In this example, the reciprocal of the corresponding attenuation factor is set for each combination of compression scheme and bit rate.

As the compression scheme, for example, it is possible to use Moving Picture Experts Group phase 2 (MPEG-2), H.264/Advanced Video Coding (H.264/AVC), H.265/High Efficiency Video Coding (H.265/HEVC), and the like. The resolution corresponds to the screen size of one frame, and the bit rate corresponds to the compression rate of the compression processing.

It is also possible to combine different bit rates for the same compression scheme. For example, in the case of terrestrial digital television broadcasting, since a video is compressed at a bit rate of 15 to 18 Mbps by MPEG-2, in addition to the combination of MPEG-2 and 10 Mbps, an entry indicating a combination of MPEG-2 and 15 to 18 Mbps may be added. Also, in addition to the combination of H.264/AVC and 10 Mbps, an entry indicating a combination of H.264/AVC and 20 Mbps may be added.

Figure 11:
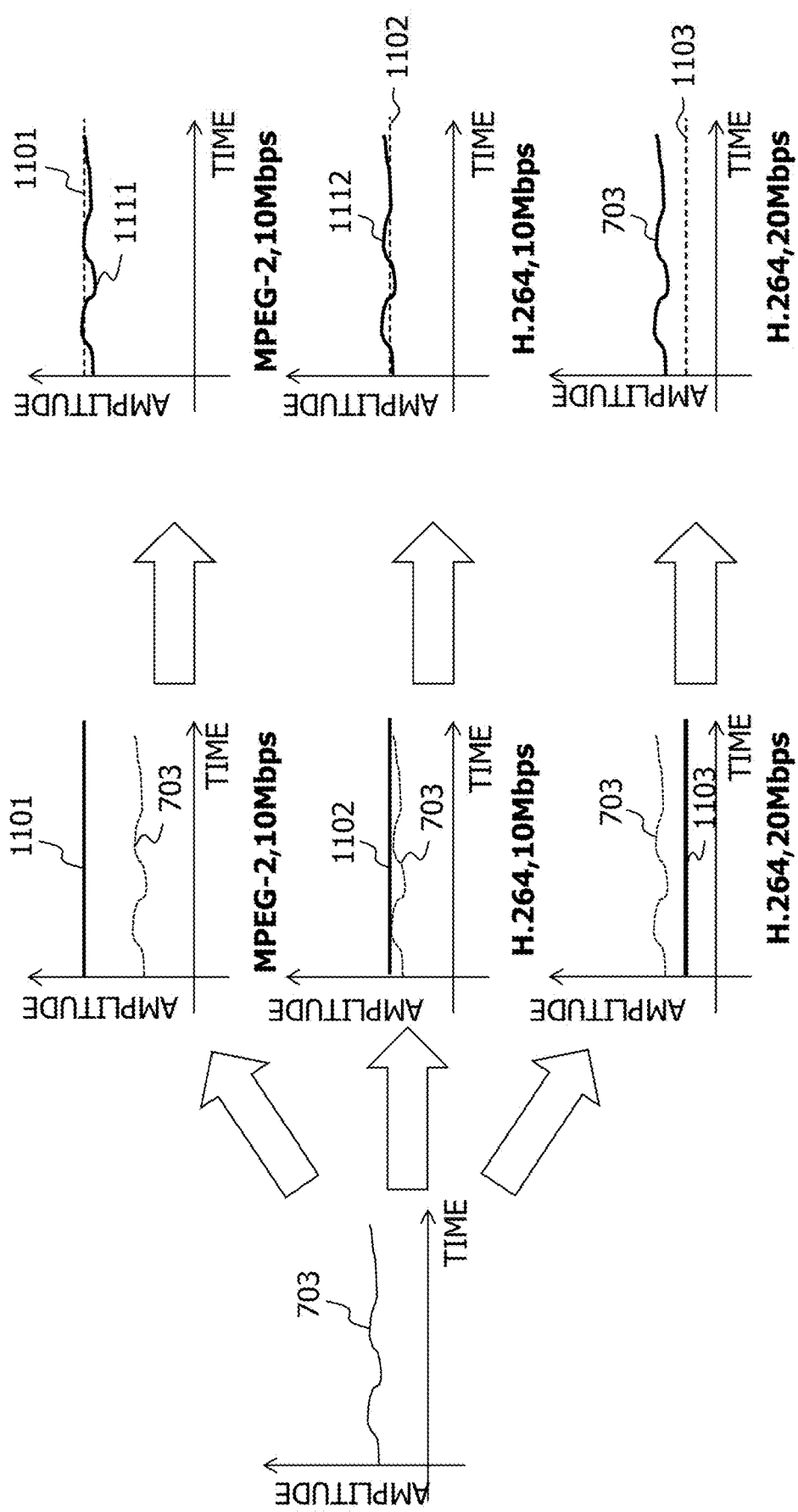
FIG. 11 is a diagram illustrating the first adjustment processing.

FIG. 11 illustrates an example of the first adjustment processing on the waveform 703 in FIG. 7C. In this example, the following three combinations are illustrated as a combination of compression scheme and bit rate.

(1) MPEG-2 and 10 Mbps
(2) H.264 and 10 Mbps
(3) H.264 and 20 Mbps

In a case where the providing apparatus 303 performs compression processing of MPEG-2 and 10 Mbps, from the reciprocal of the attenuation factor corresponding to MPEG-2 and 10 Mbps, the threshold TH1 indicated by a straight line 1101 is calculated. In this case, since the amplitude of the waveform 703 is smaller than TH1, a waveform 1111 is generated by multiplying the waveform 703 by the reciprocal of the attenuation factor, and the pixel value in the area is adjusted so that the waveform 1111 is embedded in the area in which the waveform 703 is detected.

In a case where the providing apparatus 303 performs compression processing of H.264 and 10 Mbps, from the reciprocal of the attenuation factor corresponding to H.264 and 10 Mbps, the threshold TH1 indicated by a straight line 1102 is calculated. In this case, since the amplitude of the waveform 703 is smaller than TH1, a waveform 1112 is generated by multiplying the waveform 703 by the reciprocal of the attenuation factor, and the pixel value in the area is adjusted so that the waveform 1112 is embedded in the area in which the waveform 703 is detected.

In a case where the providing apparatus 303 performs compression processing of H.264 and 20 Mbps, from the reciprocal of the attenuation factor corresponding to H.264 and 20 Mbps, the threshold TH1 indicated by a straight line 1103 is calculated. In this case, since the amplitude of the waveform 703 is larger than TH1, the pixel value in the area in which the waveform 703 is detected is not changed.

Figure 12:
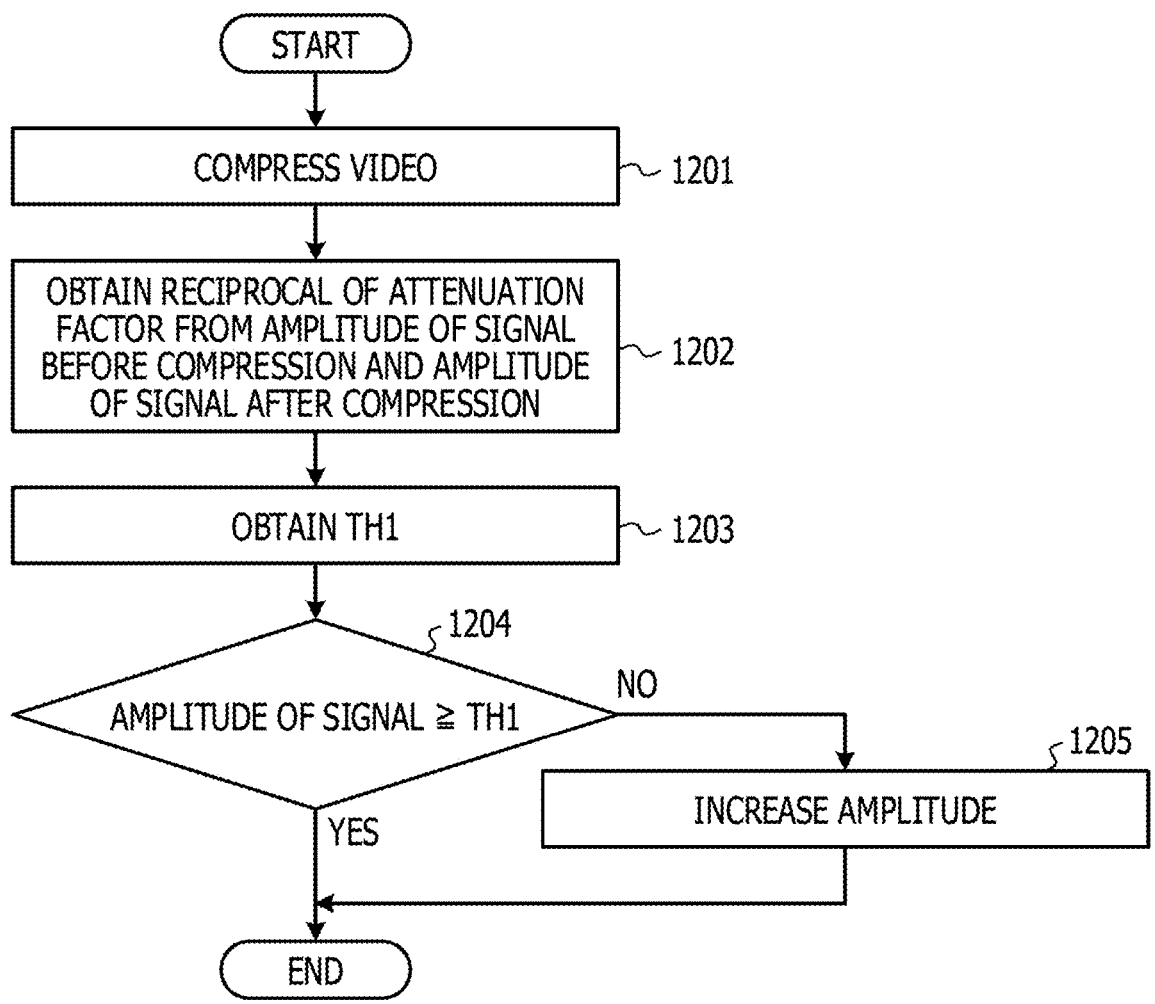
FIG. 12 is a flowchart of second adjustment processing.

FIG. 12 is a flowchart illustrating an example of second adjustment processing in step 404 of FIG. 4. In the second adjustment processing, the adjustment unit 113 compresses the video 321 by the compression processing performed by the providing apparatus 303 to obtain the reciprocal of the attenuation factor based on the amplitude A1 of the signal before compression and the amplitude A2 of the signal after compression and obtain a threshold of the amplitude from the obtained reciprocal of the attenuation factor. Then, in a case where the amplitude of the signal embedded in each area indicated by the area information 322 is smaller than the threshold, the adjustment unit 113 increases the amplitude so that the amplitude of the signal is equal to or larger than the threshold.

It is possible to obtain the reciprocal of the corresponding attenuation factor whatever the combination of compression scheme and compression rate by compressing the video 321 by the compression processing performed by the providing apparatus 303. Therefore, it is not required to prepare the attenuation factor information as illustrated in FIG. 10 in advance.

First, the adjustment unit 113 compresses the video 321 by compression processing (step 1201). Then, the adjustment unit 113 obtains the reciprocal Q of the attenuation factor from the amplitude A1 of the signal before compression and the amplitude A2 of the signal after compression by Equation (3) (step 1202). The processing of steps 1203 to 1205 is the same as the processing of steps 902 to 904 of FIG. 9.

Figure 13:
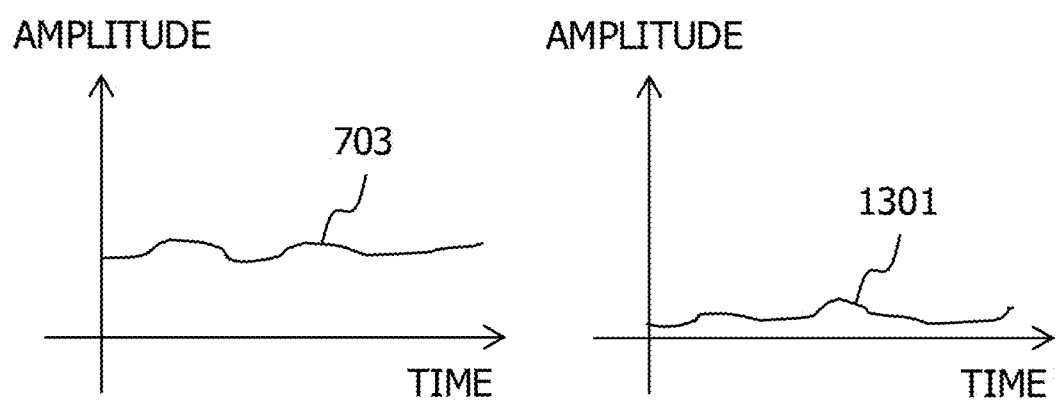
FIG. 13 is a diagram illustrating compression processing.

FIG. 13 illustrates an example of compression processing in step 1201 of FIG. 12. By compressing the video 321, the signal included in the video 321 is attenuated, and the waveform 703 of the signal before compression is changed to a waveform 1301 of the signal after compression. In this case, the reciprocal Q of the attenuation factor is obtained by using the amplitude A1 obtained from the waveform 703 and the amplitude A2 obtained from the waveform 1301.

The configuration of the signal adjustment apparatus 101 in FIGS. 1 and 3 is merely an example, and some components may be omitted or changed according to the use or conditions of the signal adjustment apparatus 101. For example, in the signal adjustment apparatus 101 of FIG. 3, in a case where the video 321 is stored in advance in the storage unit 111, the input unit 311 may be omitted.

The flowcharts of FIGS. 2, 4, 6, 9, and 12 are merely examples, and a part of processing may be omitted or changed according to the configuration or conditions of the signal adjustment apparatus 101. For example, in a case where the video 321 is stored in advance in the storage unit 111, the processing of step 401 in FIG. 4 may be omitted.

In step 404 of FIG. 4, the adjustment unit 113 may perform another adjustment processing instead of the adjustment processing of FIG. 9 or FIG. 12. For example, the adjustment unit 113 may increase or decrease the intensity of the signal embedded in each area regardless of the compression scheme and the compression rate. In step 602 of FIG. 6, the extraction unit 313 may perform frequency analysis on the temporal change of the feature amount in each area by using another analysis method instead of the Fourier transform.

The area dividing processing and the area extracting processing in FIG. 5 are merely examples and may be changed to another processing according to the configuration or the conditions of the signal adjustment apparatus 101. For example, the dividing unit 312 may divide an image 501 into a plurality of areas having a shape other than a rectangle.

The temporal change of the signal of FIGS. 7A to 7C, the upper limit value and the lower limit value in FIG. 8, the adjustment processing in FIG. 11, and the compression processing in FIG. 13 are merely examples, and the temporal change of the signal or the like changes according to the signal embedded in the illumination light, the configuration or the conditions of the signal adjustment apparatus 101.

The attenuation factor information of FIG. 10 is merely an example and may be changed to another attenuation factor information according to the configuration or the conditions of the signal adjustment apparatus 101. For example, it is also possible to omit information of any one or more of the compression scheme, the resolution, and the bit rate. In a case where the bit rate is omitted, in step 901 of FIG. 9, the adjustment unit 113 refers to the attenuation factor information to obtain the reciprocal of the attenuation factor corresponding to the compression scheme of the compression processing. On the other hand, in a case where the compression scheme is omitted, the adjustment unit 113 refers to the attenuation factor information to obtain the reciprocal of the attenuation factor corresponding to the compression rate (bit rate) of the compression processing. Instead of the reciprocal of the attenuation factor, the attenuation factor information setting the attenuation factor may be used.

Figure 14:
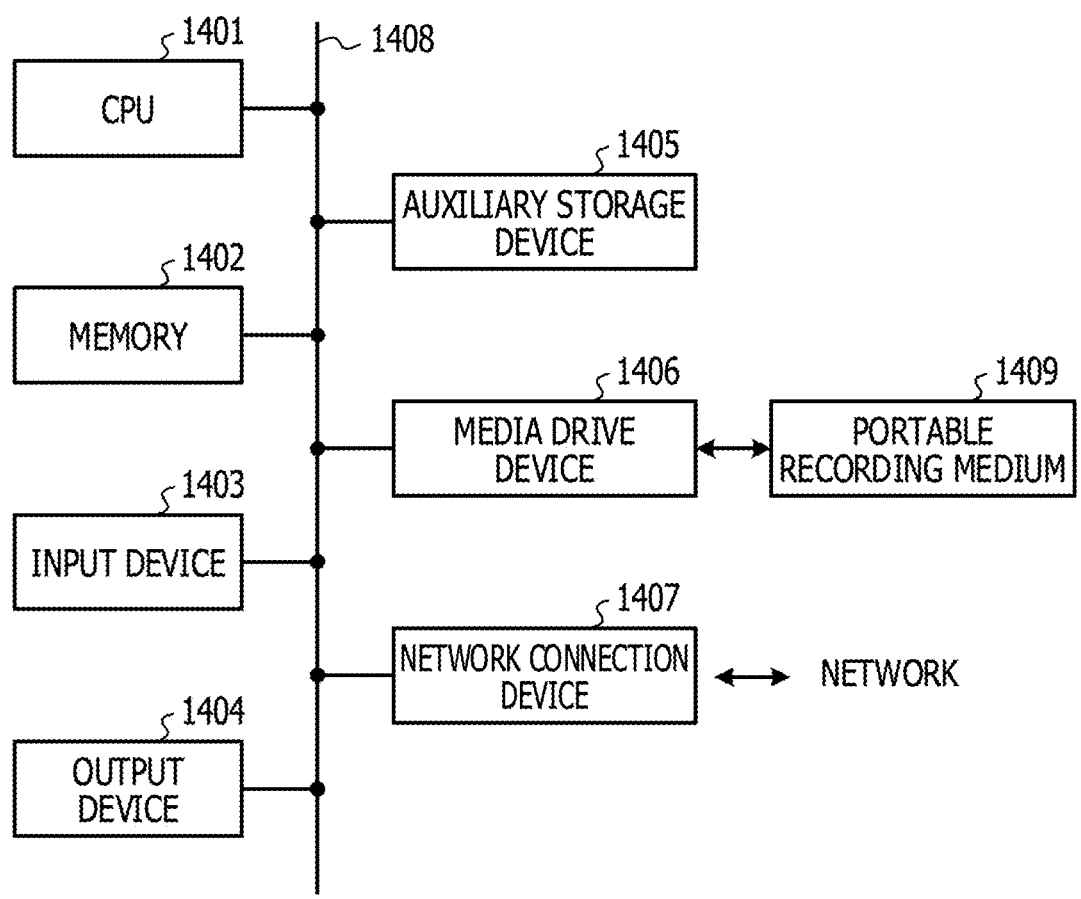
FIG. 14 is a configuration diagram of an information processing apparatus.

FIG. 14 illustrates a configuration example of an information processing apparatus (computer) used as the signal adjustment apparatus 101 in FIGS. 1 and 3. The information processing apparatus in FIG. 14 includes a central processing unit (CPU) 1401, a memory 1402, an input device 1403, an output device 1404, an auxiliary storage device 1405, a medium drive device 1406, and a network connection device 1407. These components are connected to each other by a bus 1408.

The memory 1402 is a semiconductor memory such as a read only memory (ROM), a random access memory (RAM), a flash memory, and the like and stores programs and data used for processing. The memory 1402 may be used as the storage unit 111 in FIGS. 1 and 3.

The CPU 1401 (processor), for example, operates as the area specifying unit 112 and the adjustment unit 113 in FIGS. 1 and 3, the dividing unit 312 and the extraction unit 313 in FIG. 3 by executing a program using the memory 1402.

The input device 1403 is, for example, a keyboard, a pointing device or the like and is used for inputting instructions and information from an operator or a user. The output device 1404 is, for example, a display device, a printer, a speaker or the like and is used for inquiring or instructions to the operator or the user and outputting a processing result.

The auxiliary storage device 1405 is, for example, a magnetic disk device, an optical disk device, a magneto-optical disk device, a tape device, or the like. The auxiliary storage device 1405 may be a hard disk drive. The information processing apparatus may store programs and data in the auxiliary storage device 1405 and load the programs and data into the memory 1402 for use. The auxiliary storage device 1405 may be used as the storage unit 111 in FIGS. 1 and 3.

The medium drive device 1406 drives the portable recording medium 1409 and accesses the recorded contents. The portable recording medium 1409 is a memory device, a flexible disk, an optical disk, a magneto-optical disk, or the like. The portable recording medium 1409 may be a Compact Disk Read Only Memory (CD-ROM), a Digital Versatile Disk (DVD), a Universal Serial Bus (USB) memory, or the like. The operator or the user may store programs and data in the portable recording medium 1409 and load the programs and data into the memory 1402 for use.

As described above, the computer readable recording medium for storing the program and data to be used for processing is a physical (non-transitory) storage medium such as the memory 1402, the auxiliary storage device 1405, or the portable recording medium 1409).

The network connection device 1407 is a communication interface that is connected to a communication network such as a local area network, a wide area network, and the like and performs data conversion accompanying communication. The information processing apparatus may receive programs and data from external devices via the network connection device 1407 and load the programs and data into the memory 1402 for use. The network connection device 1407 may be used as the output unit 114 in FIGS. 1 and 3 and the input unit 311 in FIG. 3.

The information processing device does not necessarily include all the constituent elements in FIG. 14, and it is also possible to omit some constituent elements according to use or conditions. For example, in a case where an interface with the operator or the user is not required, the input device 1403 and the output device 1404 may be omitted. In addition, in a case where the portable recording medium 1409 is not used, the medium drive device 1406 may be omitted. As the providing apparatus 303 in FIG. 3, the same information processing apparatus as in FIG. 14 may be used.

While the disclosed embodiment and the advantages thereof have been described in detail, those skilled in the art may make various changes, additions, and omissions without departing from the scope of the invention as explicitly set forth in the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A signal adjustment apparatus comprising:
  a memory configured to store a first video obtained by imaging an object reflecting light that changes in time series in accordance with information embedded in the light;
  a processor coupled to the memory and configured to:
    analyze the first video to specify an area in which the information is embedded in an image included in the first video;
    adjust a signal in the area; and
    output a second video including the adjusted signal,
  wherein the processor adjusts the signal by increasing or decreasing an intensity of the signal embedded in the area according to at least one of a compression scheme or a compression rate of compression processing of compressing the second video.

2. The signal adjustment apparatus according to claim 1, wherein the processor refers to attenuation factor information indicating a reciprocal of an attenuation factor corresponding to each of a plurality of compression schemes to obtain a reciprocal of an attenuation factor corresponding to the compression scheme of the compression processing and obtain a threshold of an amplitude from the reciprocal of the attenuation factor corresponding to the compression scheme of the compression processing and increases the amplitude of the signal such that the amplitude of the signal is equal to or larger than the threshold in a case where the amplitude of the signal embedded in the area is smaller than the threshold.

3. The signal adjustment apparatus according to claim 1, wherein the processor refers to attenuation factor information indicating a reciprocal of an attenuation factor corresponding to each of a plurality of compression rates to obtain a reciprocal of an attenuation factor corresponding to the compression rate of the compression processing and obtain a threshold of an amplitude from the reciprocal of the attenuation factor corresponding to the compression rate of the compression processing and increases the amplitude of the signal such that the amplitude of the signal is equal to or larger than the threshold in a case where the amplitude of the signal embedded in the area is smaller than the threshold.

4. The signal adjustment apparatus according to claim 1, wherein the processor compresses the first video by the compression processing to obtain a reciprocal of an attenuation factor based on an amplitude of the signal included in the first video before compression and an amplitude of the signal included in the first video after compression and obtain a threshold of an amplitude from the reciprocal of the attenuation factor and increases the amplitude of the signal such that the amplitude of the signal is equal to or larger than the threshold in a case where the amplitude of the signal embedded in the area is smaller than the threshold.

5. The signal adjustment apparatus according to claim 1, wherein the processor divides the image into a plurality of areas to specify the area in which the signal is embedded among the plurality of areas, based on a temporal change in a feature amount of each of the plurality of areas.

6. The signal adjustment apparatus according to claim 5, wherein the processor obtains an amplitude of the signal embedded in the area by performing frequency analysis on the temporal change in the feature amount in the area in which the signal is embedded.

7. A signal adjustment method executed by a processor, the generation method comprising:
   analyzing a first video obtained by imaging an object reflecting light that changes in time series in accordance with information embedded in the light to specify an area in which the information is embedded in an image included in the first video;
   adjusting a signal in the area; and
   outputting a second video including the adjusted signal, wherein the processor adjusts the signal by increasing or decreasing an intensity of the signal embedded in the area according to at least one of a compression scheme or a compression rate of compression processing of compressing the second video.

8. The signal adjustment method according to claim 7, wherein the processor refers to attenuation factor information indicating a reciprocal of an attenuation factor corresponding to each of a plurality of compression schemes to obtain a reciprocal of an attenuation factor corresponding to the compression scheme of the compression processing and increases the amplitude of the signal such that the amplitude of the signal is equal to or larger than the threshold in a case where the amplitude of the signal embedded in the area is smaller than the threshold.

9. The signal adjustment method according to claim 7, wherein the processor refers to attenuation factor information indicating a reciprocal of an attenuation factor corresponding to each of a plurality of compression rates to obtain a reciprocal of an attenuation factor corresponding to the compression rate of the compression processing and obtain a threshold of an amplitude from the reciprocal of the attenuation factor corresponding to the compression rate of the compression processing and increases the amplitude of the signal such that the amplitude of the signal is equal to or larger than the threshold in a case where the amplitude of the signal embedded in the area is smaller than the threshold.

10. The signal adjustment method according to claim 7, wherein the processor compresses the first video by the compression processing to obtain a reciprocal of an attenuation factor based on an amplitude of the signal included in the first video before compression and an amplitude of the signal included in the first video after compression and obtain a threshold of an amplitude from the reciprocal of the attenuation factor and increases the amplitude of the signal such that the amplitude of the signal is equal to or larger than the threshold in a case where the amplitude of the signal embedded in the area is smaller than the threshold.

11. The signal adjustment method according to claim 7, wherein the processor divides the image into a plurality of areas to specify the area in which the signal is embedded among the plurality of areas, based on a temporal change in a feature amount of each of the plurality of areas.

12. A non-transitory computer-readable storage medium storing a signal adjustment program that causes a processor to execute a process, the process comprising:
   analyzing a first video obtained by imaging an object reflecting light that changes in time series in accordance with information embedded in light to specify an area in which the information is embedded in an image included in the first video;
   adjusting a signal in the area; and
   outputting a second video including the adjusted signal, wherein the processor adjusts the signal by increasing or decreasing an intensity of the signal embedded in the area according to at least one of a compression scheme or a compression rate of compression processing of compressing the second video.

13. The non-transitory computer-readable storage medium according to claim 12, wherein the processor refers to attenuation factor information indicating a reciprocal of an attenuation factor corresponding to each of a plurality of compression schemes to obtain a reciprocal of an attenuation factor corresponding to the compression scheme of the compression processing and obtain a threshold of an amplitude from the reciprocal of the attenuation factor corresponding to the compression scheme of the compression processing and increases the amplitude of the signal such that the amplitude of the signal is equal to or larger than the threshold in a case where the amplitude of the signal embedded in the area is smaller than the threshold.

14. The non-transitory computer-readable storage medium according to claim 12, wherein the processor refers to attenuation factor information indicating a reciprocal of an attenuation factor corresponding to each of a plurality of compression rates to obtain a reciprocal of an attenuation factor corresponding to the compression rate of the compression processing and obtain a threshold of an amplitude from the reciprocal of the attenuation factor corresponding to the compression rate of the compression processing and increases the amplitude of the signal such that the amplitude of the signal is equal to or larger than the threshold in a case where the amplitude of the signal embedded in the area is smaller than the threshold.

15. The non-transitory computer-readable storage medium according to claim 12, wherein the processor compresses the first video by the compression processing to obtain a reciprocal of an attenuation factor based on an amplitude of the signal included in the first video before compression and an amplitude of the signal included in the first video after compression and obtain a threshold of an amplitude from the reciprocal of the attenuation factor and increases the amplitude of the signal such that the amplitude of the signal is equal to or larger than the threshold in a case where the amplitude of the signal embedded in the area is smaller than the threshold.

16. The non-transitory computer-readable storage medium according to claim 12, wherein the processor divides the image into a plurality of areas to specify the area in which the signal is embedded among the plurality of areas, based on a temporal change in a feature amount of each of the plurality of areas.

17. The non-transitory computer-readable storage medium according to claim 16, wherein the processor obtains an amplitude of the signal embedded in the area by performing frequency analysis on the temporal change in the feature amount in the area in which the signal is embedded.

* * * * *